United States Patent
Moniz

(10) Patent No.: US 7,624,581 B2
(45) Date of Patent: Dec. 1, 2009

(54) COMPACT BOOSTER BLEED TURBOFAN

(75) Inventor: Thomas Ory Moniz, Loveland, OH (US)

(73) Assignee: General Electric Company, Schenectady, NY (US)

( * ) Notice: Subject to any disclaimer, the term of this patent is extended or adjusted under 35 U.S.C. 154(b) by 792 days.

(21) Appl. No.: 11/314,673

(22) Filed: Dec. 21, 2005

(65) Prior Publication Data

US 2007/0137175 A1    Jun. 21, 2007

(51) Int. Cl.
*F02C 6/04* (2006.01)

(52) U.S. Cl. .......................... 60/785; 60/782; 60/226.1

(58) Field of Classification Search .................. 60/782, 60/785, 226.1, 262
See application file for complete search history.

(56) References Cited

U.S. PATENT DOCUMENTS

| | | | | |
|---|---|---|---|---|
| 3,777,489 A | | 12/1973 | Johnson et al. | |
| 5,155,993 A | * | 10/1992 | Baughman et al. | 60/226.1 |
| 5,261,228 A | * | 11/1993 | Shuba | 60/226.3 |
| 5,269,135 A | * | 12/1993 | Vermejan et al. | 60/226.1 |
| 5,279,109 A | * | 1/1994 | Liu et al. | 60/785 |
| 5,351,473 A | * | 10/1994 | Shuba | 60/782 |
| 5,357,742 A | * | 10/1994 | Miller | 60/785 |
| 5,806,303 A | * | 9/1998 | Johnson | 60/262 |
| 5,809,772 A | * | 9/1998 | Giffin et al. | 60/226.1 |
| 6,561,760 B2 | | 5/2003 | Wadia et al. | |
| 6,701,716 B2 | * | 3/2004 | Rayer et al. | 60/782 |
| 2008/0115504 A1 | * | 5/2008 | Martensson et al. | 60/785 |

\* cited by examiner

*Primary Examiner*—William H Rodríguez
(74) *Attorney, Agent, or Firm*—William S. Andes; Francis L. Conte

(57) ABSTRACT

A Turbofan engine includes a fan mounted to a fan frame inside a fan nacelle. A booster compressor is joined to the fan inboard a flow splitter. A booster bleed system is disposed inside the splitter, and includes an inlet at the compressor outlet, and an outlet joined to the bypass duct following the fan.

20 Claims, 4 Drawing Sheets

COMPACT BOOSTER BLEED TURBOFAN

BACKGROUND OF THE INVENTION

The present invention relates generally to gas turbine engines, and, more specifically, to bleed systems therein.

A turbofan aircraft engine includes a fan mounted inside a surrounding nacelle, and is driven by a low pressure turbine (LPT). An inner portion of air channeled through the fan enters a core engine in which the air is pressurized in a high pressure compressor (HPC) and mixed with fuel in a combustor for generating hot combustion gases. Energy is extracted from the combustion gases in a high pressure turbine (HPT) that drives the compressor.

The outer portion of fan air bypasses the core engine through an annular bypass duct. The pressurized air discharged from the bypass duct provides a majority of propulsion thrust of the engine for powering an aircraft in flight.

In large turbofan engines, additional power is generated by including a low pressure or booster compressor behind the fan and in front of the HPC of the core engine. The booster compressor typically includes multiple axial stages which increase pressurization of the fan air delivered to the HPC, which in turn includes multiple axial stages further increasing the pressure of the air provided to the combustor.

The typical turbofan aircraft engine is configured for operating over a flight envelope including idle, takeoff, climb, cruise, runway approach, and landing in which the power output of the engine correspondingly varies. For example, the multiple axial stages of the booster and high pressure compressors must be designed and operated for obtaining a suitable stall margin over the entire operating range. For maximum power operation of the engine, the compressors are operated at maximum airflow and maximum pressurization, with a suitable stall margin.

However, at flight idle operation during landing approach of the aircraft the engine produces relatively low power, and the HPC requires correspondingly less airflow therethrough. In order to maintain efficient operation of the engine at this part power condition, and maintain a suitable stall margin in the HPC, a portion of the pressurized booster compressor air is typically bled from the engine and dumped into the fan bypass duct.

Accordingly, a booster bleed system is typically incorporated in large turbofan aircraft engines for selectively bleeding a portion of the booster discharge air when desired for maintaining efficient operation of the engine, including suitable compressor stall margin.

The typical booster bleed system is relatively large and relatively complex and is located between the booster and high pressure compressors. For example, the turbofan engine includes a fan frame disposed between the two compressors. The frame includes a row of struts extending radially outwardly through the fan bypass duct to support the fan nacelle.

The frame also includes a center structural hub having a row of low transition ducts alternating between the inner ends of the struts for providing flow continuity between the outlet of the booster compressor and the inlet of the HPC. The hub also includes one or more bearing supports which contain bearings for supporting the fan drive shaft that joins the fan to the LPT. The rotor blades of the booster compressor are also joined to the fan drive shaft.

In a large turbofan engine, the fan frame is correspondingly large, with a correspondingly large center hub in which the typical booster bleed system may be incorporated. However, incorporation of that bleed system correspondingly requires inlet apertures in the hub for bleeding booster air. Outlet apertures are also required in the hub for channeling the bleed air into corresponding outlets in the fan bypass duct.

Any hole or aperture placed in the structural hub of the fan frame interrupts the structural integrity thereof and correspondingly requires strengthening of the hub which typically increases size and weight of the fan frame. The bleed system also requires multiple inlet valves or doors and corresponding actuating mechanisms for selectively opening and closing the bleed doors when required during operation of the engine.

The bleed system mounted inside the typical fan frame of a large turbofan engine increases the cost of manufacture of the engine, increases weight of the engine, and correspondingly decreases overall efficiency of the engine.

In the continuing development of high-bypass turbofan aircraft gas turbine engines, reductions in size and weight of the engine, without corresponding reductions in power rating are desired. In one engine undergoing development, the fan frame includes a relatively small center hub which lacks available space for introducing a conventional booster bleed system.

Furthermore, components adjoining the fan frame have limited available space for mounting those components themselves, without the additional complication of introducing a suitable booster bleed system.

Accordingly, it is desired to provide a turbofan aircraft engine with an improved booster compressor bleed system being relatively compact and simple, and having a low profile for being integrated into available space in the engine.

BRIEF DESCRIPTION OF THE INVENTION

A turbofan engine includes a fan mounted to a fan frame inside a fan nacelle. A booster compressor is joined to the fan inboard a flow splitter. A booster bleed system is disposed inside the splitter, and includes an inlet at the compressor outlet, and an outlet joined to the bypass duct following the fan.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
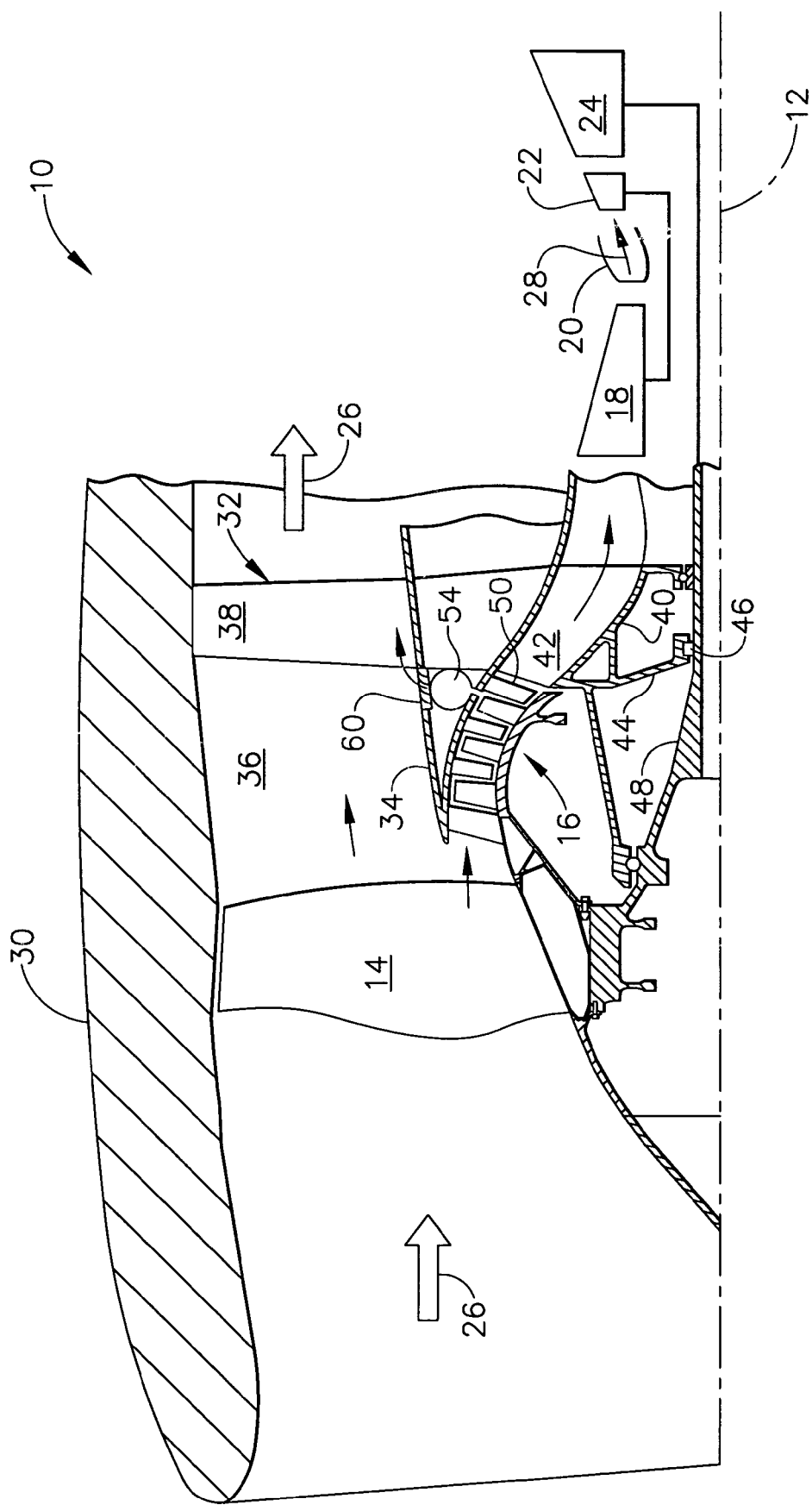
FIG. 1 is a partly schematic, axial sectional view of an aircraft turbofan gas turbine engine.

Illustrated schematically in FIG. 1 is a turbofan aircraft gas turbine engine 10 configured for powering an aircraft (not shown) in flight from takeoff to cruise to landing in the typical cycle of operation over the flight envelope. The engine is axisymmetrical about a longitudinal or axial centerline axis 12, and suitably mounted to the wing or fuselage of the aircraft.

The engine includes in serial flow communication a fan 14, booster or low pressure compressor 16, high pressure compressor 18, combustor 20, high pressure turbine (HPT) 22, and low pressure turbine (LPT) 24. The HPT or first turbine 22 is joined by one drive shaft to the high pressure or second compressor 18. And, the LPT or second turbine 24 is joined by another drive shaft to both the fan 14 and booster or first compressor 16.

In typical operation, air 26 is pressurized by the fan 14 and an inner portion of this air is channeled through the first compressor 16 which further pressurizes the air. The pressurized air is then channeled to the second compressor 18 which further pressurizes the air.

The pressurized air is mixed with fuel in the combustor 20 for generating hot combustion gases 28 that flow downstream in turn through the HPT 22 and the LPT 24. Energy is extracted in the two turbines for powering the fan 14, booster compressor 16, and high pressure compressor 18 in a conventional manner.

The turbofan engine illustrated in FIG. 1 is configured for high bypass operation and includes a short fan nacelle 30 surrounding the fan 14 and supported atop an annular fan frame 32. The booster compressor 16 is suitably joined to the fan 14 forward of the fan frame 32, and is disposed radially inboard of an annular flow splitter 34 spaced radially inwardly from the inner surface of fan nacelle 30 to define the forward portion of an annular fan bypass duct 36 therebetween.

The flow splitter 34 is a sheet metal casing surrounding the booster compressor 16 immediately behind the fan 14, and includes a sharp leading edge which splits the fan air 26 pressurized by the fan 14 into a radially inner stream channeled through the booster compressor and a radially outer stream channeled through the bypass duct 36.

The basic turbofan engine illustrated in FIG. 1 is conventional in configuration and operation for powering the aircraft in flight. The fan 14 includes a row of fan blades extending radially outwardly from a supporting rotor disk.

The booster compressor 16 includes multiple stages, such as the three stages illustrated, having corresponding compressor rotor blades extending radially outwardly from a supporting rotor disk or spool which in turn is fixedly joined to the supporting disk of the fan 14 and the corresponding drive shaft connected to the rotor disks of the LPT 24.

Similarly, the high pressure compressor 18 includes multiple rows or stages of compressor rotor blades joined by the corresponding drive shaft to the rotor disk of the HPT 22.

Both the compressors 16,18 and turbines 22,24 have corresponding stator vanes mounted in front of the respective rotor blades which cooperate for compressing the airflow in the compressors while expanding the combustion gases in the turbines in the conventional manner.

As indicated above, the exemplary turbofan engine 10 illustrated in FIG. 1 has an improved design for maximizing power rating thereof while minimizing size. In particular, the new fan frame 32 is relatively compact compared with the conventionally larger fan frame, and is disposed in the limited available space between the first and second compressors 16,18.

The compact fan frame 32 includes a row of hollow frame struts 38 extending radially outwardly through the fan bypass duct 36 to support the nacelle 30 suitably attached thereto. The struts 38 extend outwardly from an annular structural hub 40.

The central hub 40 includes a row of transition flow ducts 42 disposed circumferentially between the radially inner ends of the corresponding struts 38. The hub also includes a plurality of annular bearing supports 44 extending radially inwardly, which in turn mount corresponding bearings 46, such as the three supports and three bearings illustrated in FIG. 1. The fan frame through its hub rotatably supports the fan drive shaft 48 joined to both the rotor disk of the fan 14 and the rotors of the booster compressor 16.

Figure 2:
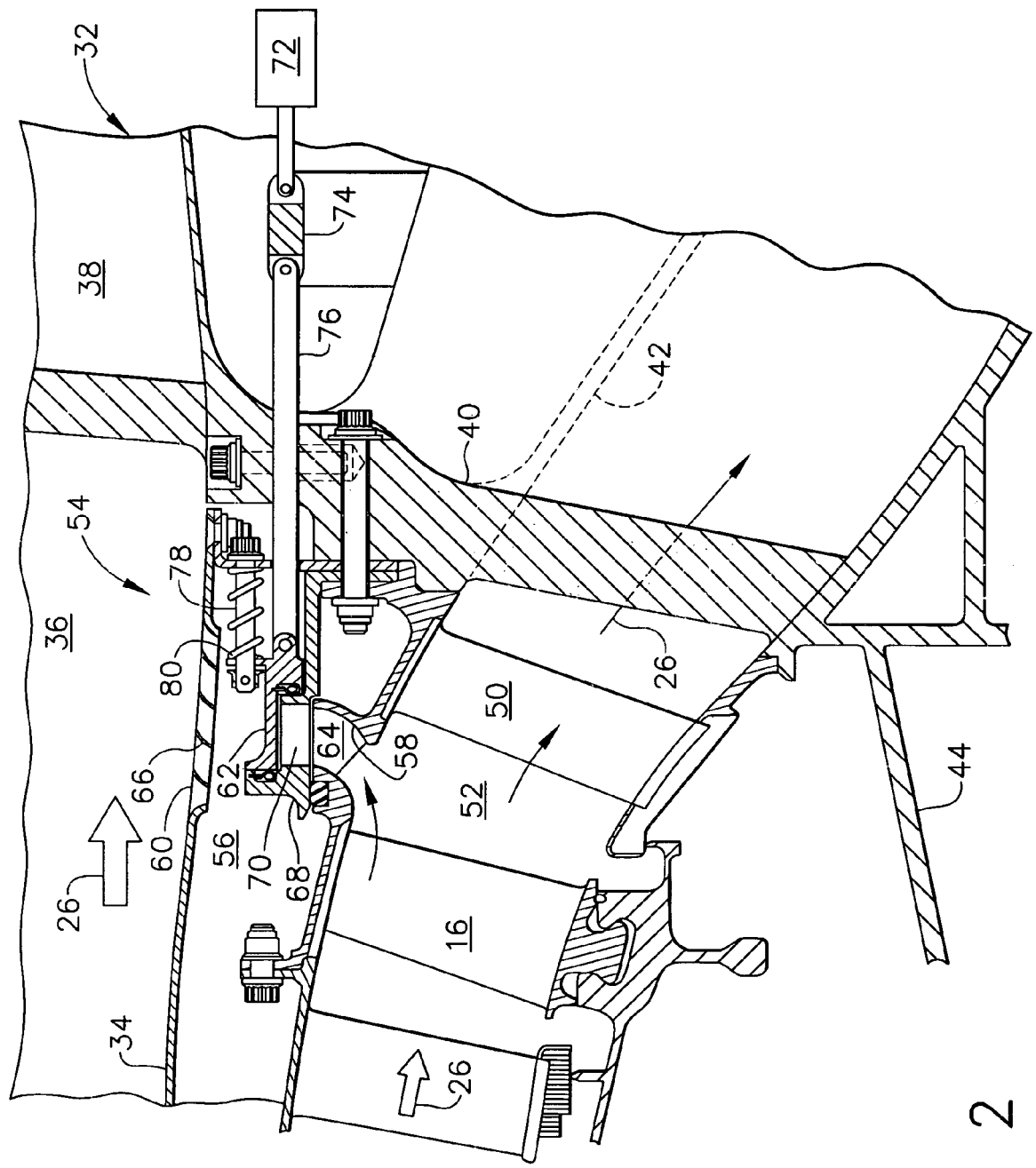
FIG. 2 is an enlarged axial sectional view of the booster bleed system illustrated in the turbofan engine of FIG. 1 shown with a closed bleed valve therein.

As shown in FIGS. 1 and 2, the engine further includes a row of conventional outlet guide vanes (OGVs) 50 disposed between the last stage of the booster compressor 16 and the hub 44 of the fan frame at the annular outlet 52 of the booster compressor. The OGVs 50 have suitable airfoil configurations for typically deswirling the air from the booster compressor as it flows through the transition ducts 42 into the inlet of the high pressure compressor 18.

The row of transition ducts 42 collectively provide a segmented annulus which joins the booster compressor outlet 52 to the high pressure compressor with relatively close coupling therebetween, and within a minimum of available space. Furthermore, the outer portion of the hub 40 illustrated in FIG. 2 between the transition ducts 42 and the bypass duct 36 is also relatively small and compact and lacks sufficient volume for incorporating the conventional bleed system described above in the Background section.

Accordingly, a low profile or compact booster bleed system or apparatus 54 is disposed in most part in the aft end of the splitter 34 as illustrated schematically in FIG. 1, and in more particularity in FIG. 2. As shown in FIG. 2, the aft end of the splitter 34 diverges where it meets the fan frame 32 and provides: an annular chamber 56 in which most, if not all, of the compact bleed system 54 may be mounted.

More specifically, the bleed system 54 includes a bleed inlet 58 disposed axially between the booster compressor 16 and the hub 44 in flow communication with the compressor outlet 52. Correspondingly, the bleed system also includes a bleed outlet 60 disposed at the aft end of the flow splitter 34 in front of the struts 38 in flow communication with the bypass duct 36.

In this way, a portion of the pressurized air from the booster compressor 16 may be bled radially outwardly through the flow splitter 34 and dumped into the fan bypass duct 36 for bypassing the core engine, and the high pressure compressor 18 therein. The bleed inlet 58 is conveniently located between the last row of rotor blades in the bleed compressor 16 and the OGVs 50 without substantially increasing the spacing therebetween in which the compressor outlet 52 is found, and without adversely affecting performance of the compressors.

To control bleed flow, a bleed valve 62 is disposed inside the splitter 34 between the bleed inlet 58 and the bleed outlet 60 to selectively open and close bleed flow between the booster compressor and the bypass duct.

Figure 3:
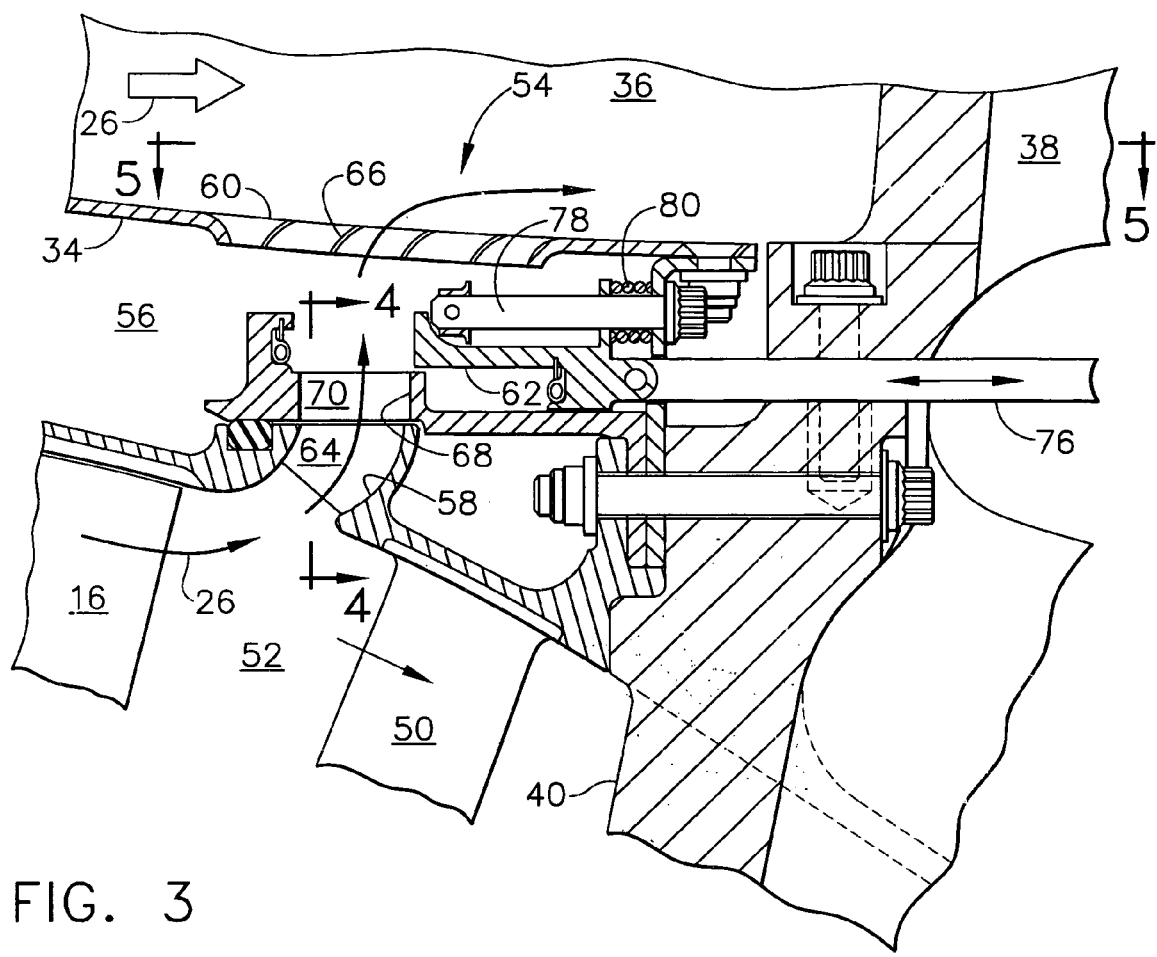
FIG. 3 is a further enlarged axial sectional view of the bleed system illustrated in FIG. 2 shown with an open bleed valve therein.

In FIG. 2, the bleed valve 62 is shown fully closed in its axially forward position. In FIG. 3, the bleed valve 62 is shown fully open in its axially aft position. In both Figures, the bleed inlet 58 is in the preferred form of an annular slot being coaxial with the engine centerline axis, and defined by a forward wall which is the aft extension of the outer casing of the booster compressor; and an aft wall which is a forward extension of the outer band supporting the OGVs 50.

The annular slot inlet 58 extends radially outwardly from the compressor outlet 52, and includes a row of inlet bleed vanes 64 spaced circumferentially apart from each other.

Correspondingly, the bleed outlet 60 is defined between a plurality of outlet louvers 66 extending circumferentially around the aft end of the splitter 34 immediately forward of the struts 38. The louvers 66 position the bleed outlet 60 radially outwardly of and radially aligned with the bleed vanes 64 found in the bleed inlet 58.

Correspondingly, the valve 62 is cylindrical and mounted in the bleed system coaxially with the engine centerline axis for axial translation between the bleed vanes 64 and the bleed louvers 66. The valve is disposed radially between the vanes 64 and louvers 66 for selectively blocking bleed flow therebetween when the valve is translated axially forward to its closed position illustrated in FIG. 2, while unblocking bleed flow when the valve is translated aft to its open position illustrated in FIG. 3.

Figure 4:
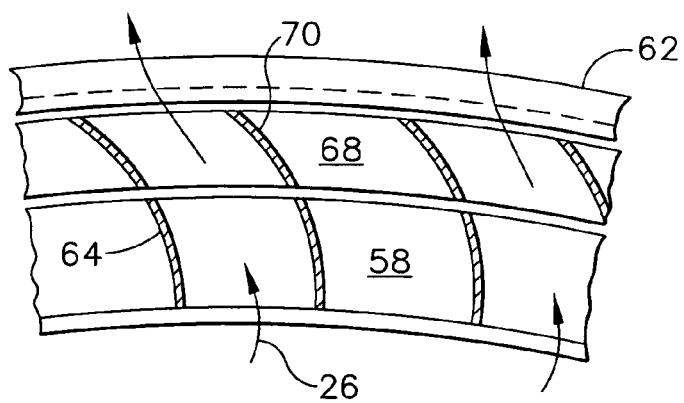
FIG. 4 is a radial sectional view through a portion of the bleed system illustrated in FIG. 3 and taken along line 4-4.

Both the bleed inlet 58 and the bleed outlet 60 are designed for maximizing aerodynamic efficiency thereof for efficiently bleeding the pressurized air from the booster compressor and dumping it overboard into the fan bypass duct 36. As shown in FIGS. 3 and 4, the bleed inlet is preferably divided into an inner slot 58 and a surrounding annular outer slot 68.

The inner slot 58 directly surrounds the compressor outlet 52, and has an axially arcuate profile which turns the bleed air from the primarily axially aft direction to a radially outward direction. The inner slot 58 defines a scoop inlet mounted substantially flush in the outer flowpath boundary of the compressor outlet 52, with the aft wall of the slot 58 having a sharp leading edge for efficiently extracting bleed air from the compressor outlet.

The outer slot 68 coaxially surrounds the inner slot 58 and extends straight radially outwardly therefrom and in radial alignment therewith. The outer slot 68 includes a corresponding row of outer bleed vanes 70 which are preferably indexed or registered with corresponding ones of the inner vanes 64 mounted in the inner slot 58.

In the preferred embodiment illustrated in FIG. 2, for example, the inner slot 58 may be formed in one annular component and suitably bolted at its aft end to the hub 40, and at its forward end to the outer casing of the booster compressor 16. The outer slot 68 may be formed in another annular component and commonly bolted at its aft end only to the hub 40 directly atop the inner slot 58. A suitable ring seal may be embedded between the frames of the two slots 58,68 for sealing together the two frames, and also sealing the outer frame containing the outer slot 68 to the forward face of the fan frame hub 40.

Figure 5:
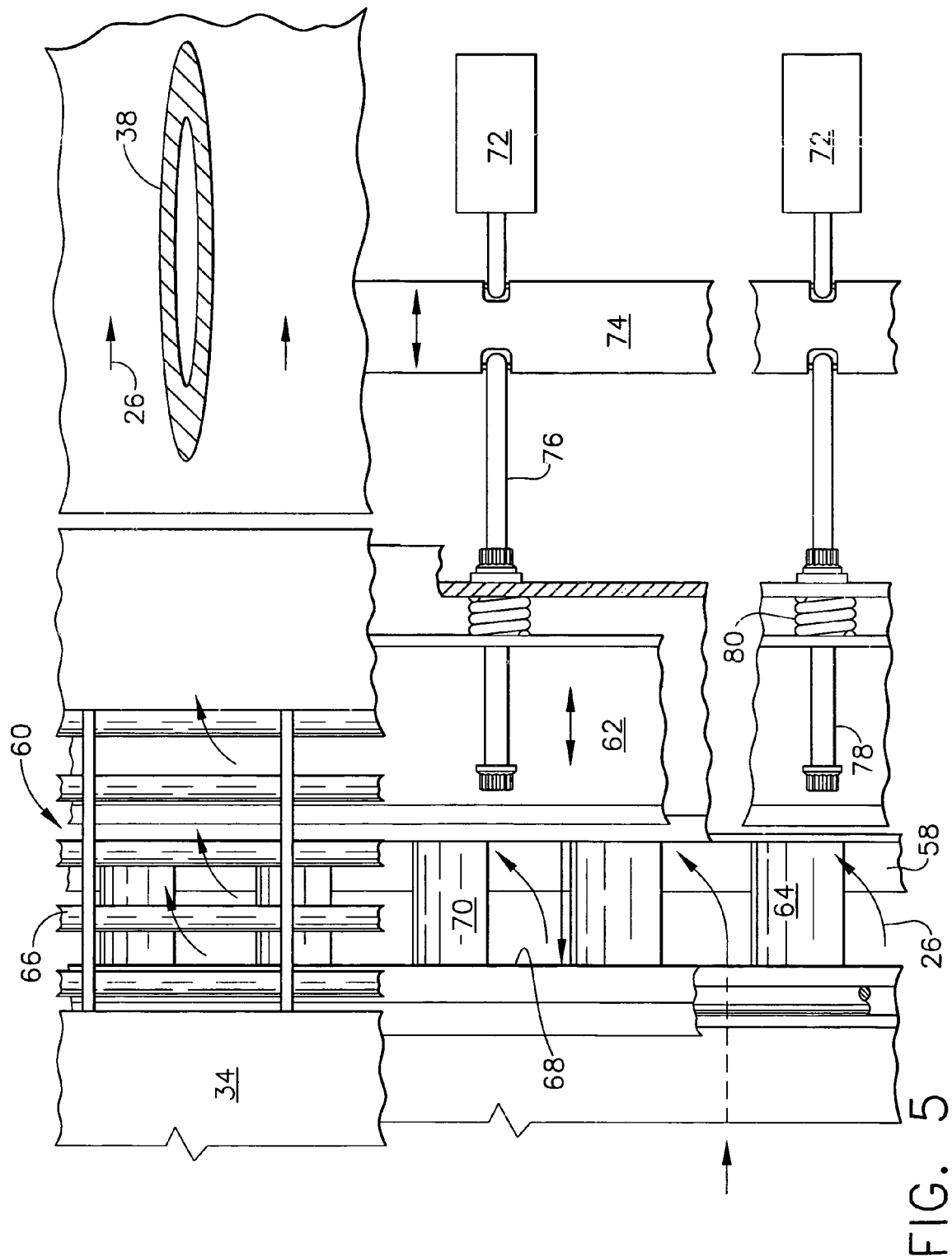
FIG. 5 is a partly sectional, planiform view of a portion of the bleed system illustrated in FIG. 3 and taken along line 5-5.

As shown in FIGS. 2 and 5, the cylindrical valve 62 is joined to a plurality of conventional linear actuators 72 for selective axial translation of the valve. For example, two of the actuators 72 may have output rods connected to a unison ring 74, with the ring 74 being joined in turn by a plurality of connecting links 76 to the aft end of the cylindrical valve 62.

Four of the links 76 may be equiangularly spaced apart around the circumference of the valve 62 and extend through corresponding, small apertures through the forward face of the hub 40 and commonly joined to the forward face of the unison ring 74. The two actuators 72 may be spaced apart equally and suitably mounted inside the hub 40 or outside the aft end thereof where space permits.

Since the inlet slots 58,68 may have relatively small axial length, the axial throw of the valve 62 is correspondingly small, and the axial throw of the actuators 72 is also correspondingly small. Accordingly, the actuators 72, unison ring 74, and connecting links 76 may be sized as small as practical to fit within a small envelope within the outer portion of the fan frame hub 40 below the fan bypass duct 36.

As indicated above, the inner slot 58 may be conveniently formed as a one piece ring and conveniently bolted in place between the aft end of the booster compressor 16 and the forward face of the fan frame hub 40. For example, the inner slot 58 may be integrally formed at its aft end with the outer band supporting the OGVs 50. The forward end of the inner slot 58 may be integrally formed with the annular casing or shroud surrounding the last stage of booster rotor blades.

Correspondingly, the outer slot 68 may be conveniently formed in a unitary annular ring or cylinder mounted at its aft end to the hub 40, and simply supported or cantilevered at its forward end atop the inner slot 58 with the suitable ring seal therebetween.

Furthermore, the cylindrical valve 62 is mounted concentrically around the outer slot 68 in a compact, laminated assembly of three rings within the limited space of the splitter chamber 56. The cylindrical valve 62 includes a distal forward end which engages a suitable P-seal at the forward end of the outer slot 68, and an aft step and another P-seal which engages an aft step of the outer slot 68 when the valve is closed. In this way, the valve 62 is suitably sealed atop the outer bleed vanes 70 when closed to fully prevent bleeding of any air from the booster compressor 16.

Since bleeding from the booster compressor is desirable only at part-power, such as during flight idle, the bleed system will remain closed for most of the operating cycle of the engine, and any bleed leakage during that time would correspondingly reduce efficiency of the engine.

When the valve 62 is open as illustrated in FIG. 3, booster bleed may be effected in a simple and aerodynamically efficient manner. For example, the bleed inlet 58 is closely coupled to the bleed outlet 60 in the limited confines of the splitter chamber 56. Correspondingly, the inner slot inlet 58 and vanes 64 have axially arcuate profiles to redirect the initially axially aft compressor airflow 26 radially outwardly in a smooth, aerodynamically efficient turn or bend into the straight, radially outwardly extending outer slot 68.

Furthermore, the bleed vanes 64,70 as shown in FIG. 4 may also be suitably curved or arcuate in the circumferential direction for deswirling the booster discharge air as it is dumped radially outwardly into the fan bypass duct 36. Or, the vanes may be otherwise configured to swirl or straighten airflow as desired for specific applications.

Correspondingly, the louvers 66 in the bleed outlet 60 have axially arcuate profiles extending radially outwardly in the aft direction for again turning the radially discharged flow from the outer slot 68 in the axially aft direction to efficiently mix with the fan bypass stream flowing aft through the bypass duct 36.

As initially shown in FIG. 2, the cylindrical valve 62 is relatively thin, with a low profile conveniently mounted in the aft splitter chamber 56 atop the bleed inlet 58. The valve 62 requires simple axial translation to open or close the bleed flowpath. As indicated above, suitable actuating means include the actuators 72, unison link 74, and connecting links 76 mounted within the hub 40 where space permits to selectively translate the ring valve 62 when desired. The actuators 72 may be suitably connected to the engine control system in conventional fashion.

Although the actuators 72 may be used to power open and power closed the slide valve 62, the valve 62 is preferably mounted to the fan frame 32 on a plurality of circumferentially spaced apart axial bolts 78. The bolts extend through an aft radial flange of the slide valve 62, and are suitably fixedly attached to the hub 40 in a ring flange specifically configured therefor.

Four of the bolts 78 may be equiangularly spaced apart from each other, with each bolt having a corresponding compression spring 80 mounted concentrically thereon to bias closed the valve 62 atop the bleed vanes 64,70.

FIG. 2 illustrates the extended compression spring 80 which effect a forward force on the slide valve 62 to close the valve atop the outer slot 68 and compress the corresponding seals.

FIGS. 3 and 5 illustrate actuation of the actuators 72 which pull the connecting links 76 in the aft direction to translate aft the valve 62 from atop the bleed vanes, while the compression spring 80 is compressed between the corresponding flanges of the valve and supporting structure.

A particular advantage of the booster bleed system disclosed above is its relatively simple configuration and compact size for conveniently fitting within the small available space provided in the aft splitter chamber 56 immediately forward of the fan frame. The bleed inlet 58,68 and cooperating bleed valve 62 may be conveniently formed as annular or cylindrical structures nested radially together in a compact assembly. The axial throw for the bleed valve 62 is relatively small and may be effected by any suitable actuation mechanism mounted within the engine where space permits.

In the exemplary embodiment illustrated in FIG. 2, the four connecting links 76 may extend through small access apertures around the rim of the fan frame hub 40, and are conveniently driven in unison by the small actuators 72 coordinated by the unison ring 74.

Accordingly, the frame hub 40 does not require the multitude of relatively large apertures to incorporate the corresponding plurality of bleed doors or valves used in the conventional bleed system in large turbofan engines. The hub therefore maintains its structural integrity, and may remain relatively small and lightweight without the requirement for strengthening thereof to accommodate conventional bleed valves or doors.

Furthermore, the actuation system for the ring valves 62 is relatively simple and has relatively few components unlike the actuation system required for the plurality of discrete hinged valves found in the conventional bleed system.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

1. A turbofan engine comprising:
   a fan, first compressor, second compressor, combustor, first turbine, and second turbine coaxially disposed in serial flow communication;
   a flow splitter surrounding said first compressor behind said fan;
   a nacelle surrounding said fan and said splitter, and spaced from said splitter to define a bypass duct therebetween;
   a fan frame disposed behind said first compressor, and including a row of struts extending radially outwardly through said bypass duct from an annular hub disposed between said first and second compressors; and
   a booster bleed system disposed inside said splitter, and including a bleed inlet disposed between said first compressor and hub, and a bleed outlet disposed at the aft end of said splitter in front of said struts.

2. An engine according to claim 1 wherein said bleed system further includes a valve disposed inside said splitter between said bleed inlet and bleed outlet to selectively open and close bleed flow between said first compressor and said bypass duct.

3. An engine according to claim 2 further comprising a row of outlet guide vanes disposed between said first compressor and said hub, and said bleed inlet is disposed between said first compressor and said vanes.

4. An engine according to claim 3 wherein:
   said first compressor includes an outlet in front of said vanes;
   said bleed inlet comprises an annular slot extending radially outwardly from said compressor outlet, and includes a row of inlet bleed vanes spaced circumferentially apart;
   said bleed outlet comprises a plurality of louvers extending circumferentially around said aft end of said splitter radially outwardly of said bleed vanes; and
   said valve is disposed radially between said bleed vanes and louvers for selectively blocking bleed flow therebetween.

5. An engine according to claim 4 wherein said valve is cylindrical, and is mounted in said bleed system for axial translation between said bleed vanes and louvers.

6. An engine according to claim 5 further comprising a plurality of actuators joined to said valve for selective axial translation thereof.

7. An engine according to claim 6 wherein:
   said bleed inlet is divided into inner and outer slots;
   said inner slot surrounding said compressor outlet, and having an axially arcuate profile;
   said outer slot surrounding said inner slot, and extending radially outwardly therefrom; and
   said inner and outer slots having corresponding bleed vanes therein.

8. An engine according to claim 7 wherein
   said inlet slot has an axially arcuate profile extending radially outwardly;
   said bleed vanes are curved circumferentially inside said axially arcuate slot; and
   said louvers have axially arcuate profiles.

9. An engine according to claim 8 wherein said valve is mounted to said fan frame on a plurality of axial bolts having compression springs thereon to bias closed said valve atop said bleed vanes.

10. An engine according to claim 8 wherein said valve is sealed closed when positioned atop said bleed vanes to prevent bleeding from said compressor.

11. A turbofan engine comprising:
    a fan rotatably mounted to a fan frame inside a fan nacelle;
    a flow splitter disposed forward of said frame and spaced from said nacelle to define a fan bypass duct therebetween;
    a booster compressor joined to said fan radially inboard of said splitter; and
    a booster bleed system disposed inside said splitter, and including a bleed inlet disposed in flow communication with an outlet of said compressor, and a bleed outlet disposed in flow communication with said bypass duct in front of said frame.

12. An engine according to claim 11 wherein:
    said fan frame includes a row of struts extending radially outwardly though said bypass duct from an annular hub;
    said hub includes a row of flow ducts joined in flow communication with said compressor outlet, and a plurality of bearing supports rotatably supporting a drive shaft joined to said fan; and
    said bleed system further includes a valve disposed inside said splitter between said bleed inlet and bleed outlet to selectively open and close bleed flow between said compressor and said bypass duct.

13. A turbofan engine comprising:

a fan rotatably mounted to a fan frame inside a fan nacelle;

a booster compressor joined to said fan forward of said frame, and disposed radially inboard of a flow splitter spaced from said nacelle to define a fan bypass duct therebetween;

said fan frame including a row of struts extending radially outwardly through said bypass duct from an annular hub;

said hub including a row of flow ducts joined in flow communication with an outlet of said compressor, and a plurality of bearing supports rotatably supporting a drive shaft joined to said fan;

a row of outlet guide vanes disposed between said compressor outlet and said hub;

a booster bleed system disposed inside said splitter, and including a bleed inlet disposed in flow communication with said compressor outlet between said compressor and said vanes, a bleed outlet disposed in flow communication with said bypass duct in front of said struts, and a valve disposed inside said splitter between said bleed inlet and bleed outlet to selectively open and close bleed flow between said compressor and said bypass duct.

14. An engine according to claim 13 wherein:

said bleed inlet comprises an annular slot extending radially outwardly from said compressor outlet, and includes a row of inlet bleed vanes spaced circumferentially apart;

said bleed outlet comprises a plurality of louvers extending circumferentially around an aft end of said splitter radially outwardly of said bleed vanes; and said valve is disposed radially between said bleed vanes and louvers for selectively blocking bleed flow therebetween.

15. An engine according to claim 14 wherein said valve is cylindrical, and is mounted in said bleed system for axial translation between said bleed vanes and louvers.

16. An engine according to claim 15 further comprising a plurality of actuators joined to said valve for selective axial translation thereof.

17. An engine according to claim 15 wherein:

said bleed inlet is divided into inner and outer slots;

said inner slot surrounding said compressor outlet, and having an axially arcuate profile;

said outer slot surrounding said inner slot, and extending radially outwardly therefrom; and said inner and outer slots having corresponding bleed vanes therein.

18. An engine according to claim 15 wherein said valve is mounted to said fan frame on a plurality of axial bolts having compression springs thereon to bias closed said valve atop said bleed vanes.

19. An engine according to claim 15 wherein said valve is sealed closed when positioned atop said bleed vanes to prevent bleeding from said compressor.

20. An engine according to claim 15 wherein:

said inlet slot has an axially arcuate profile extending radially outwardly;

said bleed vanes are curved circumferentially inside said axially arcuate slot; and said louvers have axially arcuate profiles.

* * * * *

UNITED STATES PATENT AND TRADEMARK OFFICE
CERTIFICATE OF CORRECTION

PATENT NO. : 7,624,581 B2 Page 1 of 1
APPLICATION NO. : 11/314673
DATED : December 1, 2009
INVENTOR(S) : Thomas Ory Moniz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1014 days.

Signed and Sealed this

Twenty-sixth Day of October, 2010

David J. Kappos
*Director of the United States Patent and Trademark Office*